(12) United States Patent
Jones et al.

(10) Patent No.: US 11,970,988 B2
(45) Date of Patent: Apr. 30, 2024

(54) STARTING ENGINE WITH GENERATOR TO IDLE SPEED OR HIGHER WITHOUT FUELING

(71) Applicant: BAE Systems Controls Inc., Endicott, NY (US)

(72) Inventors: Christopher C. Jones, Vestal, NY (US); Mark R. Stepper, Columbus, IN (US)

(73) Assignee: BAE Systems Controls Inc., Endicott, NY (US)

( * ) Notice: Subject to any disclaimer, the term of this patent is extended or adjusted under 35 U.S.C. 154(b) by 573 days.

(21) Appl. No.: 17/267,659

(22) PCT Filed: Sep. 14, 2018

(86) PCT No.: PCT/US2018/051058
§ 371 (c)(1),
(2) Date: Feb. 10, 2021

(87) PCT Pub. No.: WO2020/055422
PCT Pub. Date: Mar. 19, 2020

(65) Prior Publication Data
US 2021/0310427 A1 Oct. 7, 2021

(51) Int. Cl.
*F02D 31/00* (2006.01)
*B60K 6/24* (2007.10)
(Continued)

(52) U.S. Cl.
CPC ............. *F02D 31/007* (2013.01); *B60K 6/24* (2013.01); *B60K 6/26* (2013.01); *B60K 6/28* (2013.01);
(Continued)

(58) Field of Classification Search
CPC ....... F02D 31/007; F02M 31/02; F02N 11/04; F02N 2200/024; F02N 2200/121;
(Continued)

(56) References Cited

U.S. PATENT DOCUMENTS

2005/0000481 A1   1/2005   Asakawa et al.
2005/0114002 A1   5/2005   Rodgers
(Continued)

FOREIGN PATENT DOCUMENTS

WO   WO-2013108385 A1 *   7/2013   ............. B60K 6/445

OTHER PUBLICATIONS

International Search Report, PCT/US18/51058, dated Dec. 6, 2018, 12 pages.

*Primary Examiner* — James M McPherson
*Assistant Examiner* — Kyle J Kingsland
(74) *Attorney, Agent, or Firm* — Gary McFaline; Scully Scott Murphy & Presser PC

(57) ABSTRACT

Systems for efficiently starting an engine of a hybrid electric vehicle are provided. An example of a system comprises a first processor and a second processor. The second processor is configured to determine when to start an internal combustion engine, cause energy to be supplied from an energy storage device to a generator/motor to cause the generator/motor and crankshaft to rotate to at least a hold speed, transmit a first instruction to a first processor when determining that the internal combination engine should be started. The first processor does not supply fuel to at least one cylinder of the internal combustion engine in response to the first instruction. The second processor is configured to transmit a second instruction to the first processor after a variable period of time has elapse after the generator/motor or crankshaft has reached at least the hold speed.

20 Claims, 14 Drawing Sheets

(51) Int. Cl.
- *B60K 6/26* (2007.10)
- *B60K 6/28* (2007.10)
- *F02M 31/02* (2019.01)
- *F02N 11/04* (2006.01)
- *F02P 19/02* (2006.01)

(52) U.S. Cl.
CPC ............ *F02M 31/02* (2013.01); *F02N 11/04* (2013.01); *F02P 19/02* (2013.01); *B60K 2006/268* (2013.01); *F02N 2200/024* (2013.01); *F02N 2200/121* (2013.01)

(58) Field of Classification Search
CPC .......... F02N 2200/023; F02N 2200/025; F02P 19/02; B60K 6/24; B60K 6/26; B60K 6/28; B60K 2006/268; B60W 2510/0638; B60W 2510/0671; B60W 2510/0676; B60W 2510/068; B60W 2510/081; B60W 2710/0644; B60W 2710/0666; B60W 10/08; Y02T 10/62

See application file for complete search history.

(56) References Cited

U.S. PATENT DOCUMENTS

| | | |
|---|---|---|
| 2007/0209619 A1 | 9/2007 | Leone |
| 2008/0146411 A1* | 6/2008 | Choi .................... B60W 10/08 477/76 |
| 2008/0275600 A1 | 11/2008 | Rask et al. |
| 2009/0183706 A1 | 7/2009 | Miwa et al. |
| 2014/0257608 A1 | 9/2014 | Dufford |
| 2016/0046281 A1 | 2/2016 | Nedorezov et al. |

* cited by examiner

| Temperature | Time |
|---|---|
| Temp 1 | Time 1 |
| Temp 2 | Time 2 |
| Temp 3 | Time 3 |
| Temp 4 | Time 4 |
| Temp N | Time N |

| Temperature | Adjustment |
|---|---|
| Temp 1 | ΔTime 1 |
| Temp 2 | ΔTime 2 |
| Temp 3 | ΔTime 3 |
| Temp 4 | ΔTime 4 |
| Temp N | ΔTime N |

| Temperature | Hold Speed |
|---|---|
| Temp 1 | Hold Speed 1 |
| Temp 2 | Hold Speed 2 |
| Temp 3 | Hold Speed 3 |
| Temp 4 | Hold Speed 4 |
| Temp N | Hold Speed N |

| Temperature | Adjustment |
|---|---|
| Temp 1 | ΔHold Speed 1 |
| Temp 2 | ΔHold Speed 2 |
| Temp 3 | ΔHold Speed 3 |
| Temp 4 | ΔHold Speed 4 |
| Temp N | ΔHold Speed N |

| Pressure | Time |
|---|---|
| Pressure 1 | Time 1 |
| Pressure 2 | Time 2 |
| Pressure 3 | Time 3 |
| Pressure 4 | Time 4 |
| Pressure N | Time N |

| Pressure | Adjustment |
|---|---|
| Pressure 1 | ΔTime 1 |
| Pressure 2 | ΔTime 2 |
| Pressure 3 | ΔTime 3 |
| Pressure 4 | ΔTime 4 |
| Pressure N | ΔTime N |

| Pressure | Hold Speed |
|---|---|
| Pressure 1 | Hold Speed 1 |
| Pressure 2 | Hold Speed 2 |
| Pressure 3 | Hold Speed 3 |
| Pressure 4 | Hold Speed 4 |
| Pressure N | Hold Speed N |

| Pressure | Adjustment |
|---|---|
| Pressure 1 | ΔHold Speed 1 |
| Pressure 2 | ΔHold Speed 2 |
| Pressure 3 | ΔHold Speed 3 |
| Pressure 4 | ΔHold Speed 4 |
| Pressure N | ΔHold Speed N |

STARTING ENGINE WITH GENERATOR TO IDLE SPEED OR HIGHER WITHOUT FUELING

FIELD OF THE DISCLOSURE

This disclosure relates to hybrid electrical vehicles. More particularly, the disclosure relates to reducing emissions from internal combustion engines and fuel efficiency.

BACKGROUND

When engines are started from a cold-start, they can be inefficient and create wear on engines. One of the reasons for the wear on the engines is a lack of lubrication. Additionally, a conventional starter only brings the engine speed up to a fraction of low idle speed. During this transition from zero speed, to the speed the starter operates at, and then up to setpoint of the low idle speed governor the engine may apply fuel inefficiently. Further, during starting, emissions from the engine may be high due to this inefficiency and as well as the performance of the after-treatment system. Emission spikes may be seen during a time it takes for the after-treatment system to achieve operational temperature.

SUMMARY

Accordingly, disclosed is a system for a hybrid electric vehicle comprising a generator/motor mechanically couplable to a crankshaft of an internal combustion engine, a rechargeable energy storage device in electrical communication with the generator/motor, and a second processor. The second processor is configured to determine when to start the internal combustion engine, cause energy to be supplied to the generator/motor to cause the generator/motor and crankshaft to rotate to at least a hold speed, and transmit a first instruction to a first processor when determining that the internal combustion engine should be started. The first processor does not supply fuel to at least one cylinder of the internal combustion engine in response to the first instruction. The second processor is further configured to transmit a second instruction to the first processor after a variable period of time has elapse after the generator/motor or crankshaft has reached at least the hold speed. The variable period of time is based at least on a temperature measurement. When a second instruction is received, the first processor supplies fuel to the at least one cylinder of the internal combustion engine at a determined timing. The start is completed when the engine supplies fuel to maintain its operation at a desired operational level, which is at least at a setpoint of the low idle speed governor.

The temperature measurement may be ambient air, intake manifold air, aftertreatment system air, exhaust air, oil, fuel, coolant, and DEF.

The variable period of time may be also based on at least one pressure measurement.

The hold speed may be based at least on a temperature measurement and/or pressure measurement.

A computer readable medium having instructions for executing the above functions is also disclosed.

In other aspects, disclosed is a computer readable storage device having instructions, which when executed by a processor, cause the processor to execute: determining when to start an internal combustion engine of a hybrid electric vehicle; causing energy to be supplied to a generator/motor mechanically couplable to the internal combustion engine, to cause the generator/motor or crankshaft to rotate to at least a hold speed and transmitting a first instruction to an engine processor when determining that the internal combustion engine should be started. The engine processor causes fueling only while at or below a low idle speed governor influence and stops fueling when the crankshaft speed exceeds the low idle speed governor influence. The instructions further cause the processor to transmit a second instruction to the engine processor after a variable period of time has elapsed after the generator/motor or crankshaft has reached at least the hold speed. The variable period of time is based on at least on a temperature. The engine processor causes fueling to the internal combustion engine in response to the second instruction according to a command included in the second instruction.

In other aspects, disclosed is computer readable storage device having instructions, which when executed by a processor, cause the processor to execute: determining when to start an internal combustion engine of a hybrid electric vehicle; causing energy to be supplied to a generator/motor mechanically coupleable to the internal combustion engine, to cause the generator/motor or crankshaft to rotate to at least a hold speed; whereby an engine processor causes fueling only while at or below a low idle speed governor influence and stops fueling when the crankshaft speed exceeds the low idle speed governor influence; and cease the energy supplied to the generator/motor for the purposes of starting after a variable period of time has elapsed after the generator/motor or crankshaft has reached at least the hold speed, the variable period of time being based on at least on a temperature. Thereafter, the engine processor causes fueling to the internal combustion engine as needed.

DRAWINGS

FIG. 2 illustrates an example of a look-up table for a hold time based on a primary temperature detection in accordance with aspects of the disclosure;

FIG. 3 illustrates an example of a look-up table for adjustment to the hold time based on secondary temperature detection in accordance with aspects of the disclosure;

FIG. 5 illustrates an example of a look-up table for a hold speed based on a primary temperature detection in accordance with aspects of the disclosure;

FIG. 6 illustrates an example of a look-up table for adjustment to the hold speed based on secondary temperature detection in accordance with aspects of the disclosure;

FIG. 8 illustrates an example of a look-up table for a hold time based on a primary pressure detection in accordance with aspects of the disclosure;

FIG. 9 illustrates an example of a look-up table for adjustment to the hold time based on secondary pressure detection in accordance with aspects of the disclosure;

FIG. 11 illustrates an example of a look-up table for a hold speed based on a primary pressure detection in accordance with aspects of the disclosure;

FIG. 12 illustrates an example of a look-up table for adjustment to the hold speed based on secondary pressure detection in accordance with aspects of the disclosure;

DETAILED DESCRIPTION

In a hybrid electric vehicle, an internal combustion engine functions either to charge an energy store device, such as a battery or help propel the vehicle. There are various different types of internal combustion engines, such as spark ignition engine (e.g., gasoline engine fueled) and compression ignition engines (e.g., diesel fuel). The performance of each type of engine (especially at startup), depends on the temperature and pressure of various different fluids including ambient air, intake manifold air, aftertreatment system air, exhaust air, oil, fuel, coolant, and DEF.

In accordance with aspects of the disclosure, the system 1 uses detected temperatures and/or pressures to determine when to apply fuel during startup of the engine.

Figure 1:
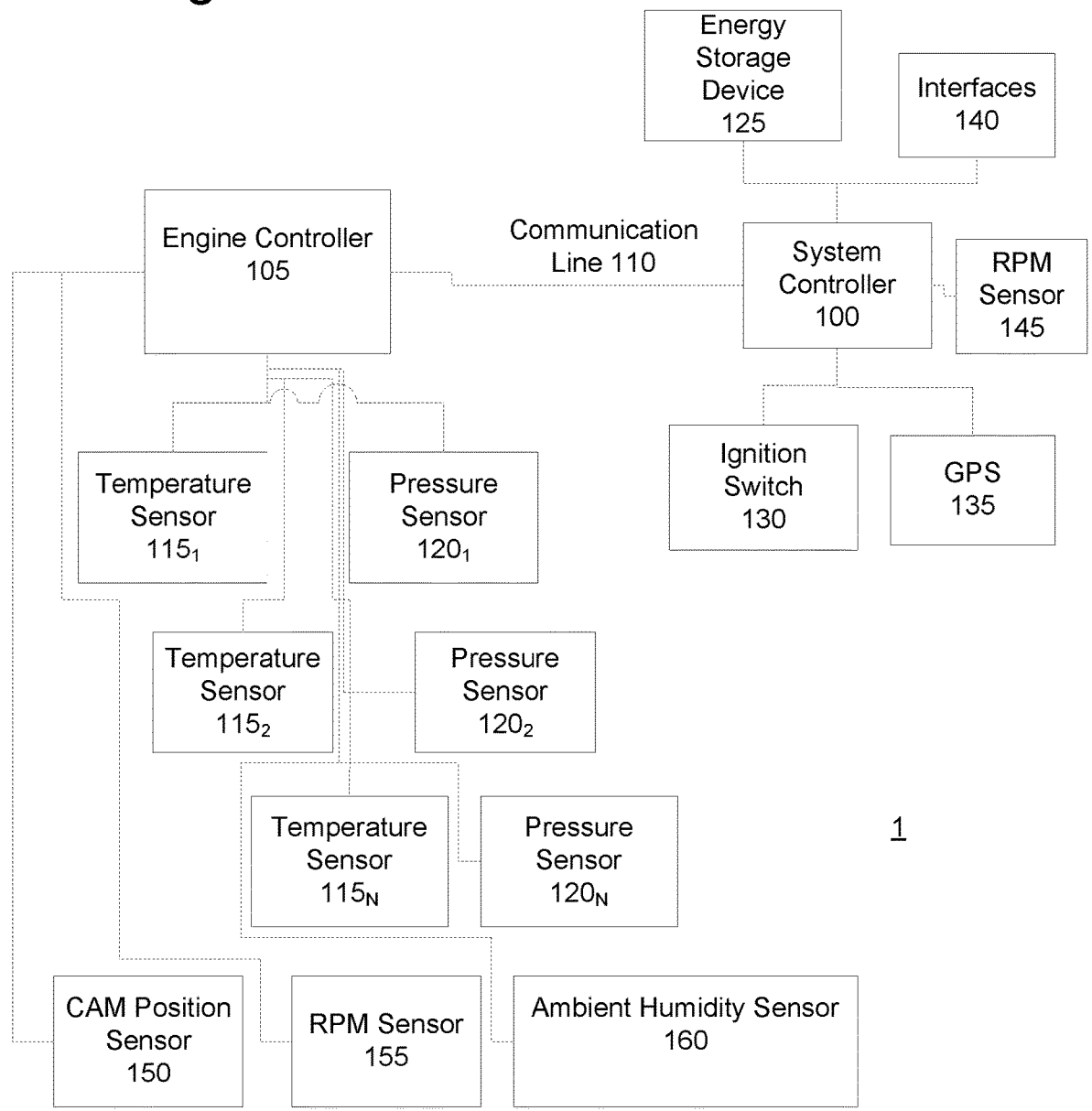
FIG. 1 illustrates a block diagram showing inputs to an engine control system in accordance with aspects of the disclosure.

FIG. 1 illustrates a block diagram an engine control system 1 in accordance with aspects of the disclosure. The system 1 comprises a system controller 100 and an engine controller 105. The system controller 100 may be a controller of a hybrid electric vehicle. The engine controller 105 may be mounted on an internal combustion engine. The system controller 100 and engine controller 105 may be a microcontroller or microprocessor or any other processing hardware such as a CPU or GPU. The microcontroller or microprocessor includes at least one data storage device, such as, but not limited to, RAM, ROM and persistent storage (not shown in the figures). In an aspect of the disclosure, the engine controller can be configured to execute one or more programs stored in a computer readable storage device. The computer readable storage device can be RAM, persistent storage or removable storage. A storage device is any piece of hardware that is capable of storing information, such as, for example without limitation, data, programs, instructions, program code, and/or other suitable information, either on a temporary basis and/or a permanent basis.

The system controller 100 and engine controller 105 communicate with each other via a communication line 110. The communication line 110 may be a communication bus. In another aspect of the disclosure, the system controller 100 and engine controller 105 may communicate with each other wirelessly.

The system 1 further comprises a plurality of temperature sensors 115. Each temperature sensor 115 is configured to sense a temperature of a fluid. The temperature sensors may be thermistors (positive temperature coefficient and negative temperature coefficient sensors). In other aspects of the disclosure, other types of temperature sensors may be used such as a thermocouple, semiconductor based or infrared sensors.

In an aspect of the disclosure, one of the temperature sensors (e.g., $115_1$) is an ambient air temperature sensor ("AATS"). The AATS, e.g., $115_1$, may be located behind a front grill or bumper or inside one of the fenders. As depicted in FIG. 1, the AATS is coupled to the engine controller 105. However, in other aspects of the disclosure, the AATA may be coupled to the system controller 100 or both.

In an aspect of the disclosure, one of the temperature sensors (e.g. $115_2$) is a coolant temperature sensor. For example, the coolant temperature sensor may be a negative temperature coefficient sensor, e.g., the internal resistance decreases as the temperature rises. The coolant temperature sensor $115_2$ is electrically coupled to the engine controller 105. The engine controller 105 supplies a voltage across the coolant temperature sensor and detects a response. The detected response, e.g., a voltage drop across the sensor (e.g., $115_2$), changes according to the temperature. The engine controller 105 may calculate the temperature based on the change. In an aspect of the disclosure, the coolant temperature sensor may be located in a coolant pipe.

In an aspect of the disclosure, one of the temperature sensors (e.g. $115_3$) is an exhaust temperature sensor. Different types of internal combustion engines have different after-treatment systems and components thereof. For example, the after-treatment system for a CNG engine includes a catalytic converter and other exhaust components. The after-treatment system for a diesel engine may use a selective catalytic reduction (SCR) exhaust system, a diesel oxidation catalyst with an ammonia oxidation section, and a diesel particulate filter (DPF). The after-treatment system for a natural gas engine may use a catalytic converter and exhaust gas recirculation system. Thus, the exhaust temperature sensor may be located in different positions depending on the type of engine. For example, an exhaust temperature sensor may be located in front of the particular filter or at the rear of a muffler. In another aspect of the disclosure, the exhaust temperature sensor may be located within the catalytic converter. In other aspects of the disclosure, multiple temperature sensors are used for the catalytic converter (upstream and downstream).

In another aspect of the disclosure, a temperature sensor is used to detect a temperature of the diesel exhaust fluid (DEF) if the engine is a diesel engine. For example, a DEF temperature sensor is disposed near the DEF tank and/or DEF metering unit.

In an aspect of the disclosure, one of the temperature sensors (e.g. $115_4$) is an oil temperature sensor. The oil temperature sensor is disposed within an oil pipe or line or in passage or on passage surface or sump of the engine.

In an aspect of the disclosure, one of the temperature sensors (e.g. $115_5$) is a fuel temperature sensor. The fuel temperature sensor is disposed within a fuel tank or in a line or rail or passage surface or fuel injection system.

In an aspect of the disclosure, one of the temperature sensors (e.g. $115_6$) is an intake air temperature (IAT) sensor. The IAT sensor is disposed along the air intake line or air induction system or manifold or passage surface or air filter assembly and measures the temperature of the air entering the internal combustion engine.

Each of the above sensors is electrically connected to the engine controller 105 and the engine controller may calculate the temperature based on the value(s) received from the sensors.

The system 1 further comprises a plurality of pressure sensors 120. Each pressure sensor 120 is configured to sense a pressure of a fluid. The pressure sensor 120 may be a piezoresistive strain gauge. In other aspects of the disclosure, the pressure sensor 120 may be capacitive, electromagnetic or piezoelectric.

In an aspect of the disclosure, one of the pressure sensors (e.g., $120_1$) is an ambient air pressure (BARO) sensor. In an aspect of the disclosure, the BARO is mounted on the inside of the front fender or some location on the engine or vehicle. In other aspects of the disclosure, a BARO sensor is incorporated into an intake manifold sensor (manifold absolute pressure sensor (MAP) sensor) (e.g., $120_2$).

In an aspect of the disclosure, one of the pressure sensors (e.g. $120_3$) is an exhaust pressure sensor. As noted above, different types of internal combustion engines have different after-treatment systems and components thereof. Thus, the exhaust pressure sensor may be located in different positions depending on the type of engine. For example, an exhaust pressure sensor may be located in front of the particular filter (inlet) or at or near the exhaust manifold. In another aspect of the disclosure, the sensor may be located on the outlet (DPF sensor box).

In another aspect of the disclosure, a pressure sensor is used to detect a pressure of the diesel exhaust fluid (DEF) if the engine is a diesel engine. For example, a DEF pressure sensor is disposed near the DEF tank and/or DEF metering unit or lines.

In another aspect of the disclosure, a pressure sensor may be used to detect pressure of intake air, or compressed air and located on the intake manifold or somewhere downstream of the turbocharger effect.

In an aspect of the disclosure, one of the pressure sensors (e.g. $120_4$) is an oil pressure sensor. The oil pressure sensor is disposed within an oil pipe or line or somewhere downstream of the oil pump.

In an aspect of the disclosure, one of the pressure sensors (e.g. $120_5$) is a fuel pressure sensor. The fuel pressure sensor is disposed within a fuel tank or fuel line or somewhere downstream of the fuel pump.

Each of the above sensors is electrically or wirelessly connected to the engine controller 105 and the engine controller may calculate the pressure based on the value(s) received from the sensors.

In other aspects of the disclosure, additional sensors electrically or wirelessly coupled with the engine controller 105, may be included, such as a CAM position sensor 150, a RPM Sensor (speed) 155 and ambient humidity sensor 160.

The system controller 100 is connected to an energy storage device 125, an ignition switch 130, a global positioning system (GPS) and interfaces 140.

The energy storage device 125 may be a rechargeable high voltage battery or capacitor or other electrical energy storage or hydraulic storage or flywheel or other mechanical energy storing method. The system controller 100 is configured to determine or receive from the energy storage device over a communication line or bus, the state of charge or capacity (SOC) of the energy storage device.

The interfaces 140 comprise an accelerator pedal and a brake pedal. An operator of the vehicle issues propulsion related commands (torque, speed) commands using the accelerator and brake pedals.

In an aspect of the disclosure, the system controller 100 receives or detects a key-on signal from the ignition switch 130, e.g., SLI (starting, lighting and ignition) signal.

In an aspect of the disclosure, the system controller 100 receives a current position of the vehicle from the GPS 135.

In other aspects of the disclosure, the system controller 100 is also coupled to the temperature 115 and pressure sensors 120. These sensors may be the same sensors described above. In other aspects of the disclosure, additional temperature and pressure sensors may be used. These sensors may be used for redundancy.

In an aspect of the disclosure, the system controller 100 determines whether the engine needs to be started based on the key on signal received from the ignition switch 130, the requested propulsion related commands (torque, speed) from the interfaces 140, the current SOC of the energy storage device 125, or the position of the vehicle as determined from the GPS. In another aspect of the disclosure, the system controller 100 may use an expected driving path also when determining whether the engine needs to be started.

For example, in a case where the HEV is a parallel hybrid, the system controller 100 may determine that the engine needs to be started when energy required to meet the operator commands from the interfaces 140 exceeds a level capable of being produced by a motor coupled to the drive line using only power from the energy storage device 125. The engine would be started to provide additional power to the drive the vehicle.

In a case where the HEV is a series hybrid, the system controller 100 may determine that the engine needs to be started when the SOC of the energy storage device is below a specific threshold. The engine would be started to charge the energy storage device 125.

In another example, the location of the vehicle may impact the starting of the engine. For example, the system controller 100 may have preset locations where engine usage is restricted such as urban areas. Additionally, altitude may be used to determine whether to start the engine. For example, in areas that may include downhill sections where energy may be recovered for regenerative braking to recharge the energy storage device 125, the engine may not be needed.

The system controller 100 may compare the current location received from the GPS 135 with the preset locations where engine usage is restricted. When the current location is not one of the restricted locations, the system controller 100 may determine that the engine can be started.

In another aspect of the disclosure, the system controller 100 may determine to start the engine when the key-on signal is received/detected from the ignition switch 130.

In other aspects of the disclosure, more than one of the above determinations may be combined to determine when to start the engine.

In accordance with aspects of the disclosure, once the system controller 100 determines that the engine needs to be started, fueling of the engine is withheld, delayed or restricted until the engine is run at a hold speed or a hold time. The hold speed and/or hold time is determined by the system controller 100 based on at least one temperature and/or pressured detected by one or more of the temperature sensors 115 and/or pressure sensors 120.

Figure 14:
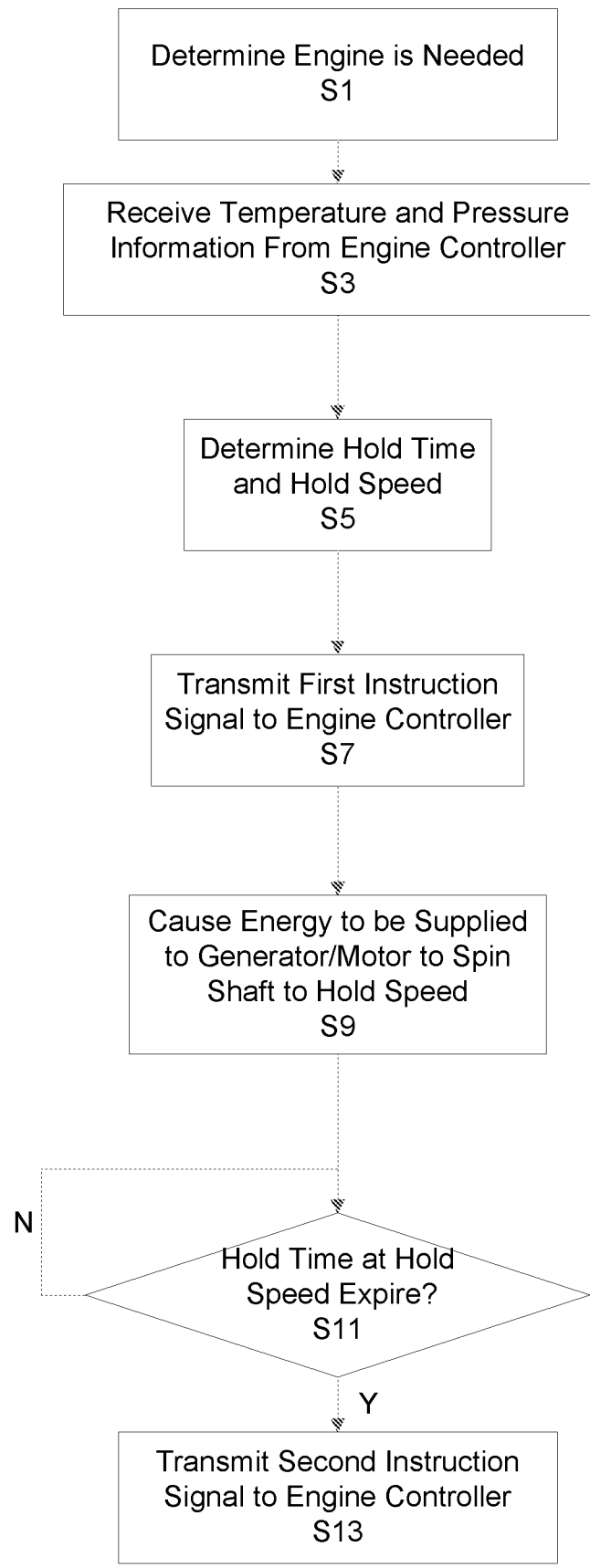
FIG. 14 illustrates a flow chart for controlling an engine during engine start up executed by a system controller in accordance with aspects of the disclosure.
Figure 15:
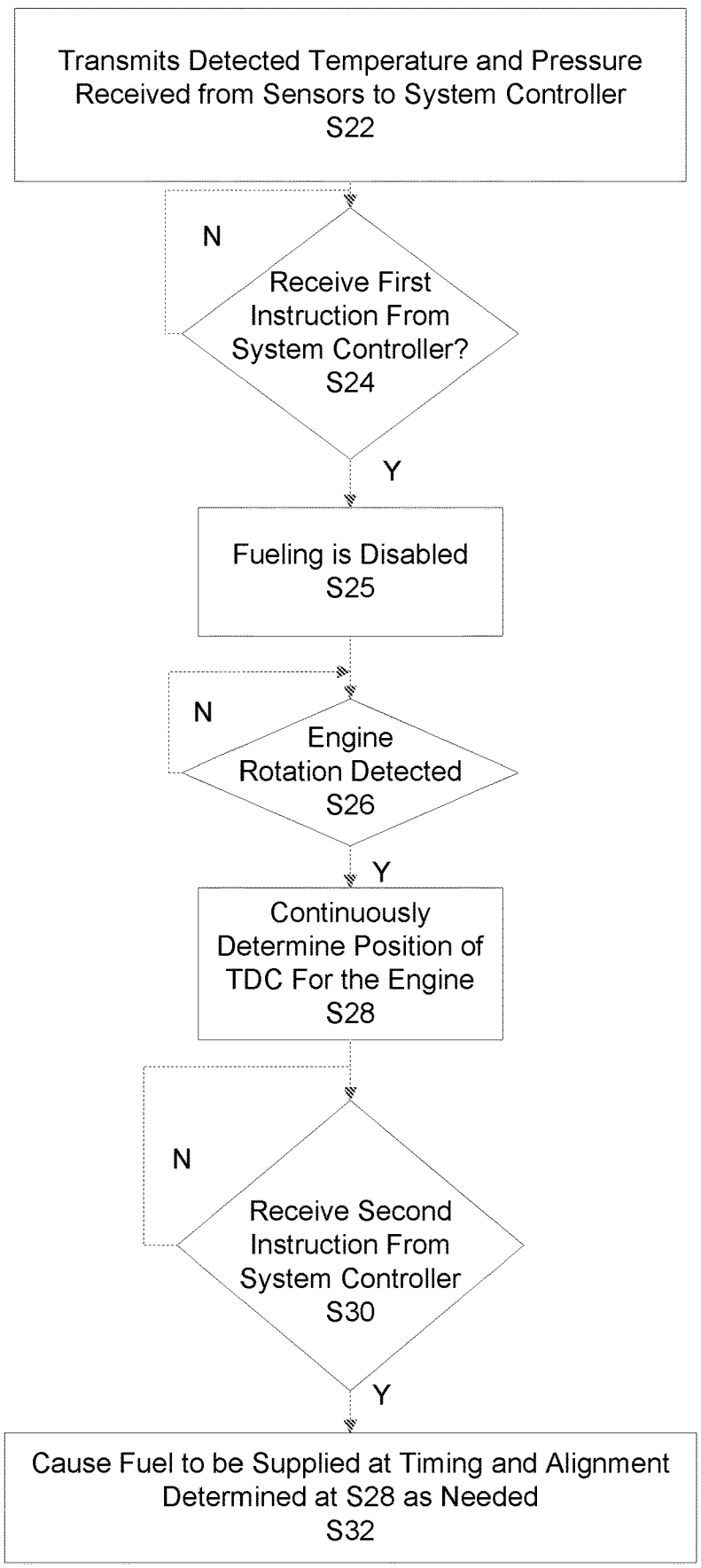
FIG. 15 illustrates a flow chart for controlling an engine during engine start up executed by an engine controller in accordance with aspects of the disclosure.

FIGS. 14 and 15 depict a method for controlling an engine in accordance with aspects of the disclosure.

At S1, the system controller 100 determines whether the engine needs to be started as described above. At S3, the system controller 100 receives temperature and/or pressure information from the engine controller 105. In an aspect of the disclosure, the temperature and/or pressure information is periodically received via the communication line 110. Additionally, the temperature and/or pressure information may be received one or more times per firing event. As described above, the temperature may be ambient air, intake manifold air, aftertreatment system air, exhaust air, oil, fuel, coolant, and/or DEF, etc. Similarly, the pressure may be ambient air, intake manifold air, aftertreatment system air, exhaust air, oil, fuel, coolant, and/or DEF pressure.

At S5, the system controller 100 determines the hold speed and/or hold time based on the received temperature and pressure.

In an aspect of the disclosure, the hold time may be based on temperature only. One of the temperatures may be determined as a "primary" temperature for determining a hold time. The relationship between the primary temperature and the hold time may be determined in advance. The relationship is specific to a type of engine and may be specific to a type of vehicle. For example, a look up table (LUT) may be populated with temperature and hold time values. An example, of a primary temperature and hold time LUT 200 is depicted in FIG. 2. The primary temperature/time LUT 200 may include N different temperatures and N different times. N may be determined by the size of the memory.

In aspect of the disclosure, the coolant temperature may be selected as the primary temperature. The coolant temperature has an inverse relationship with hold time. For example, as the coolant temperature increases, the hold time decreases. Certain vehicles may include auxiliary heating from oil or coolant heaters and block heaters. By using the coolant temperature as the primary temperature, the hold time accounts for the auxiliary heating.

In other aspects of the disclosure, other fluid temperatures may be selected as the primary temperature, such as ambient temperature or oil temperature.

When a temperature/time LUT 200 is used, the system controller 100 retrieves the same from memory and compares the detected temperature with temperatures in the table and selects the associated or corresponding time from the table. In a case where the memory is small or where the LUT 200 does not have a detected temperature, the system controller 100 interpolates the time based on the temperatures/times included in the temperature/time LUT 200. In an aspect of the disclosure, the system controller 100 may select the closest temperatures to the detected temperature, to interpolate the time. In another aspect of the disclosure, the system controller 100 may use all of the temperatures/times in the LUT 200 for interpolation.

Figure 4:
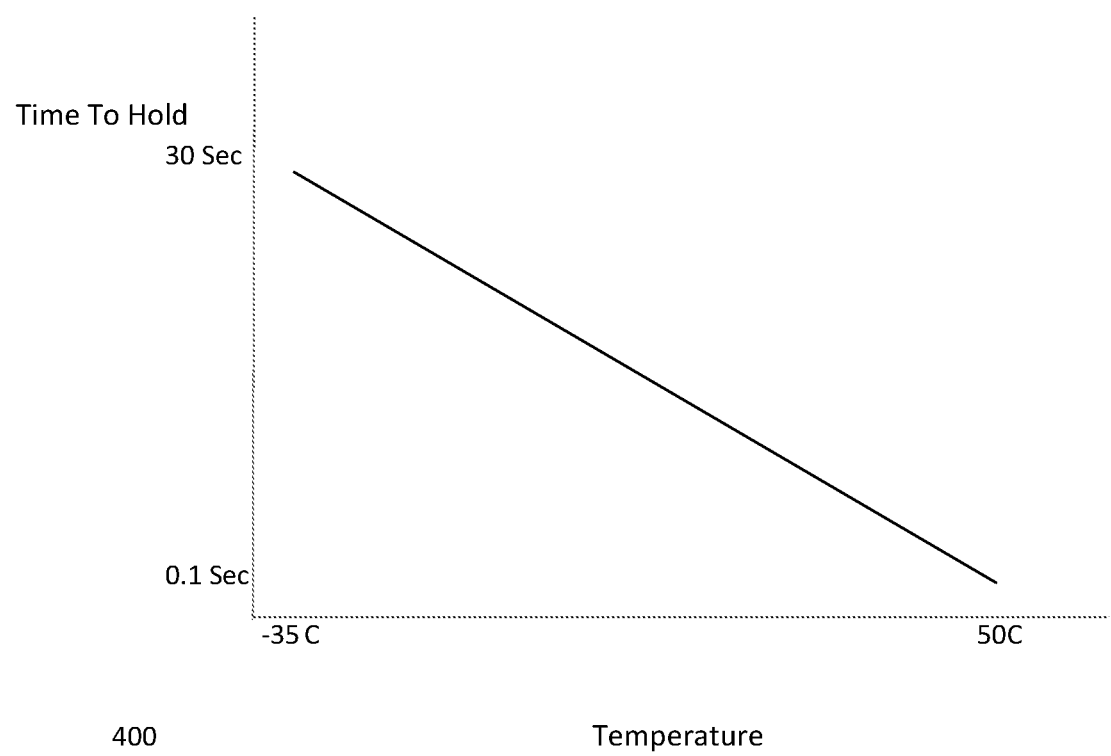
FIG. 4 illustrates an example of a primary temperature verses hold time relationship in accordance with aspects of the disclosure.

Instead of a temperature/time look-up table 200, the system controller 100 may have a relationship graph or equation pre stored in memory. FIG. 4 illustrates an example of a relationship graph 400 for the hold time (time to hold) and temperature. While FIG. 4 depicts a linear relationship between hold time and temperature, the relationship may not be linear. In the example depicted in FIG. 4, the hold time may be between 0.1 seconds and 30 second depending on the temperature (between −35° C. and 50° C.). The hold times and temperatures depicted in FIG. 4 are for description purposes only and the specific times and temperature relationship may change or be different in use. For example, these values may be different for different types of engines.

Other temperatures (other than the primary) are used as secondary temperatures. Secondary temperatures are used to adjust the hold time which was determined. FIG. 3 illustrates an example of a temperature adjustment LUT for hold time 300.

For example, when the coolant temperature is selected as the primary temperature, oil temperature may be selected as the secondary temperature. Thus, the system controller 100 may determine the hold time may use both LUT 200 and 300. For example, when the primary temperature is Temp 3 (e.g., coolant temperature) and secondary temperature is Temp 4 (e.g., oil temperature), the system controller 100 determines the hold time to be Time 3+ΔTime 4. The Δ Time may be positive or negative. Other combinations of primary and secondary temperatures may be used such as, but not limited to, oil temperature and ambient temperature or oil temperature and DEF. For example, when the primary temperature is Temp 2 (e.g., oil temperature) and secondary temperature is Temp 1 (e.g., ambient temperature), the system controller 100 determines the hold time to be Time 2+ΔTime 1.

Multiple temperatures may be selected as secondary temperatures. For example, when coolant temperature is selected as the primary temperature, at least two of the ambient air, intake manifold air, aftertreatment system air, exhaust air, oil, fuel, or DEF temperatures may be set as the secondary temperatures.

In this case, the system controller 100 stores a plurality of LUTs 300, one for each secondary temperature. For example, when the primary temperature is Temp 3 (e.g., coolant temperature) and secondary temperatures is Temp 2 (e.g., oil temperature) and Temp 4 (DEF), the system controller 100 determines the hold time to be Time 3+ΔTime 2+ΔTime 4. Once again, the ΔTime may be positive or negative.

Similarly, in an aspect of the disclosure, the hold speed may be based on temperature only. One of the temperatures may be determined as a "primary" temperature for determining a hold speed. The relationship between the primary temperature and the hold speed may be determined in advance. The relationship is specific to a type of engine and may be specific to a type of vehicle. For example, a look up table (LUT) 500 may be populated with temperature and hold speed values. An example, of a primary temperature and hold speed LUT 500 is depicted in FIG. 5. The primary temperature/speed LUT 500 may include N different temperatures and N different speeds. N may be determined by the size of the memory.

The primary temperature may or may not be the same for hold time as the hold speed. For example, the primary temperature for hold time may be coolant temperature whereas, the primary temperature for hold speed may be intake air temperature.

If the coolant temperature is selected as the primary, as with the hold time, the coolant temperature has an inverse relationship with hold speed. For example, as the coolant temperature increases, the hold speed decreases.

In other aspects of the disclosure, other fluid temperatures may be selected as the primary temperature, such as ambient temperature or oil temperature.

When a temperature/speed LUT 500 is used, the system controller 100 retrieves the same from memory and compares the detected temperature with temperatures in the table and selects the associated or corresponding speed from the table. In a case where the memory is small or where the LUT 500 does not have a detected temperature, the system controller 100 interpolates the speed based on the temperatures/speeds included in the temperature/speed LUT 500. In an aspect of the disclosure, the system controller 100 may select the closest temperatures to the detected temperature, to interpolate the speed. In another aspect of the disclosure, the system controller 100 may use all of the temperatures/speeds in the LUT 500 for interpolation.

Figure 7:
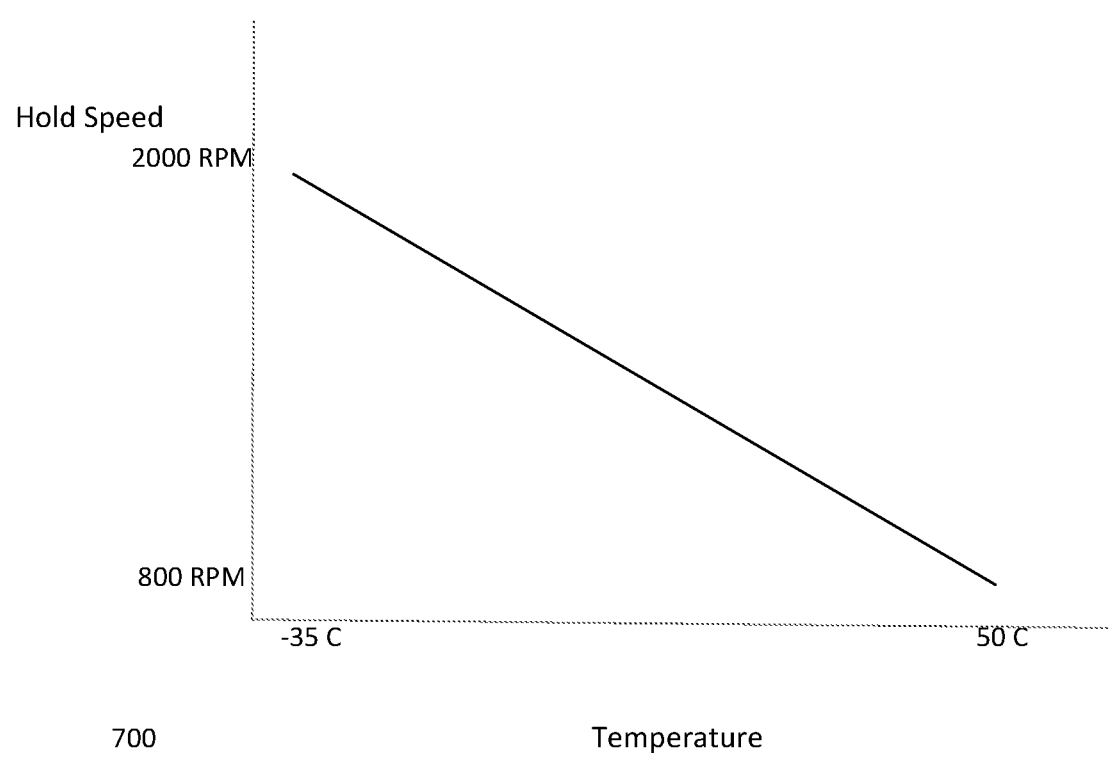
FIG. 7 illustrates an example of a primary temperature verses hold speed relationship in accordance with aspects of the disclosure.

Instead of a temperature/speed look-up table 500, the system controller 100 may have a relationship graph or equation pre stored in memory. FIG. 7 illustrates an example of a relationship graph 700 for the hold speed and temperature. While FIG. 7 depicts a linear relationship between hold speed and temperature, the relationship may not be linear. In the example depicted in FIG. 7, the hold speed may be between 800 RPM and 2000 RPM depending on the temperature (between −35° C. and 50° C.). The hold speeds and temperatures depicted in FIG. 7 are for description purposes only and the specific speed and temperature relationship may change or be different in use. For example, these values may be different for different types of engines.

Other temperatures (other than the primary) are used as secondary temperatures. Secondary temperatures are used to adjust the hold speed which was determined. FIG. 6 illustrates an example of a temperature adjustment LUT for hold speed 600.

For example, when the coolant temperature is selected as the primary temperature, oil temperature may be selected as the secondary temperature. Thus, the system controller 100 may determine the speed time using both LUT 500 and 600. For example, when the primary temperature is Temp 3 (e.g., coolant temperature) and secondary temperature is Temp 4 (e.g., oil temperature), the system controller 100 determines the hold speed to be Speed 3+ΔSpeed 4. The Δ Speed may be positive or negative. Other combinations of primary and secondary temperatures may be used such as, but not limited to, oil temperature and ambient temperature or oil temperature and DEF. For example, when the primary temperature is Temp 2 (e.g., oil temperature) and secondary temperature is Temp 1 (e.g., ambient temperature), the system controller 100 determines the hold speed to be Speed 2+ΔSpeed 1.

Multiple temperatures may be selected as secondary temperatures. For example, when coolant temperature is selected as the primary temperature, at least two of the ambient air, intake manifold air, aftertreatment system air, exhaust air, oil, fuel, and DEF temperatures may be set as the secondary temperatures.

In this case, the system controller 100 stores a plurality of LUTs 600, one for each secondary temperature.

In an aspect of the disclosure, the hold speed is greater than the speed setpoint of the low idle speed governor of the engine.

In another aspect of the disclosure, instead of secondary adjustment temperature/time or temperature/speed LUT 300/600, the system controller 100 may have a plurality of temperature/time LUT 200 or temperature/speed LUT 500. Each set of LUT may be populated at a different secondary temperature. Therefore, instead of using multiple LUTs for each of the time and speed determinations, the system controller 100 would use one for each.

In another aspect of the disclosure, the hold time may be based on pressure only.

As with the temperature, one of the pressures may be determined as a "primary" pressure for determining a hold time. The relationship between the primary pressure and the hold time may be determined in advance. The relationship is specific to a type of engine and may be specific to a type of vehicle. For example, a look up table (LUT) may be populated with pressure and hold time values. An example, of a primary pressure and hold time LUT 800 is depicted in FIG. 8. The primary pressure/time LUT 800 may include N different pressures and N different times. N may be determined by the size of the memory.

In an aspect of the disclosure, the coolant pressure may be selected as the primary pressure. The coolant pressure has an inverse relationship with hold time. For example, as the coolant pressure increases, the hold time decreases.

In other aspects of the disclosure, other fluid pressures may be selected as the primary pressure, such as ambient air, intake manifold air, aftertreatment system air, exhaust air, oil, fuel, and DEF.

When a pressure/time LUT 800 is used, the system controller 100 retrieves the same from memory and compares the detected pressure with pressures in the table and selects the associated or corresponding time from the table. In a case where the memory is small or where the LUT 800 does not have a detected pressure, the system controller 100 interpolates the time based on the pressures/times included in the pressure/time LUT 800. In an aspect of the disclosure, the system controller 100 may select the closest pressures to the detected pressure, to interpolate the time. In another aspect of the disclosure, the system controller 100 may use all of the pressures/times in the LUT 800 for interpolation.

Figure 10:
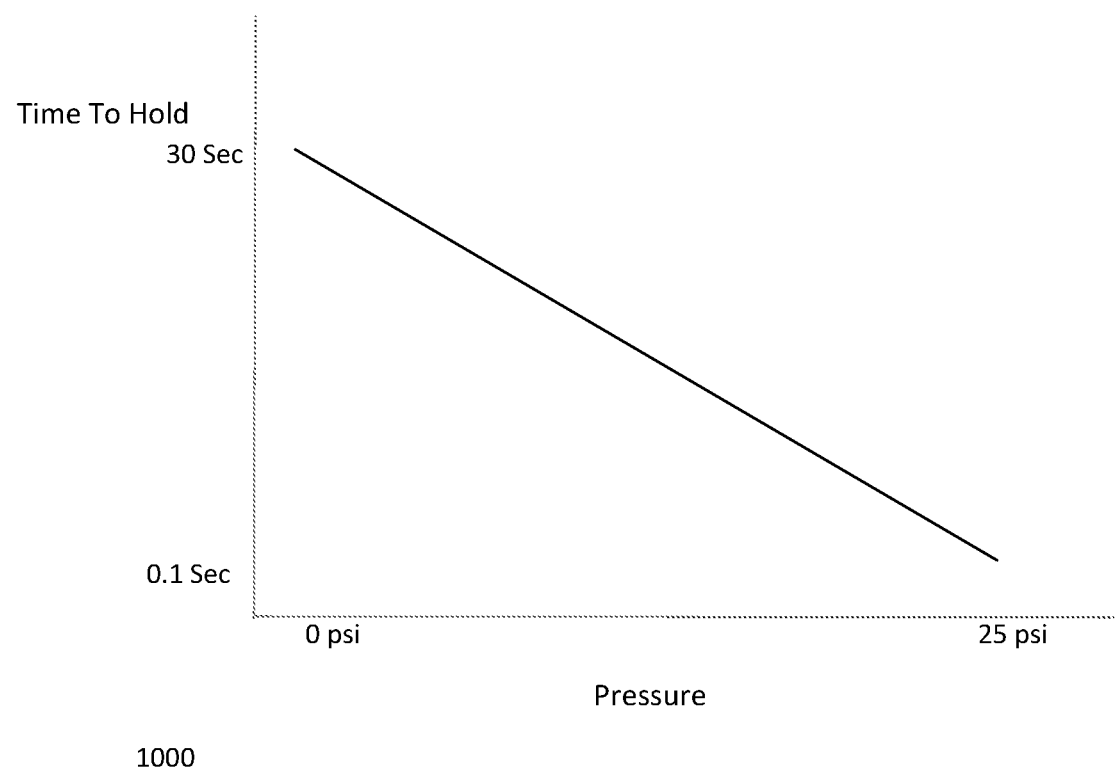
FIG. 10 illustrates an example of a primary pressure verses hold time relationship in accordance with aspects of the disclosure.

Instead of a pressure/time look-up table 800, the system controller 100 may have a relationship graph or equation pre stored in memory. FIG. 10 illustrates an example of a relationship graph 1000 for the hold time (time to hold) and pressure. While FIG. 10 depicts a linear relationship between hold time and pressure, the relationship may not be linear. In the example depicted in FIG. 10, the hold time may be between 0.1 second and 30 second depending on the pressure (between 0 psi and 25 psi). The hold times and pressures depicted in FIG. 10 are for description purposes only and the specific hold time and pressure relationship may change or be different in use. For example, these values may be different for different types of engines.

Other pressures (other than the primary) are used as secondary pressures. Secondary pressures are used to adjust the hold time which was determined. FIG. 9 illustrates an example of a pressure adjustment LUT for hold time 900.

For example, when the coolant pressure is selected as the primary pressure, oil pressure may be selected as the secondary pressure. Thus, the system controller 100 may determine the hold time using both LUT 800 and 900. For example, when the primary pressure is Pressure 3 (e.g., coolant pressure) and secondary pressure is Pressure 4 (e.g., oil pressure), the system controller 100 determines the hold time to be Time 3+ΔTime 4. The ΔTime may be positive or negative. Other combinations of primary and secondary pressures may be used such as, but not limited to, oil pressure and ambient pressure or oil pressure and DEF. For example, when the primary pressure is Pressure 2 (e.g., oil pressure) and secondary pressure is Pressure 1 (e.g., ambient pressure), the system controller 100 determines the hold time to be Time 2+ΔTime 1.

Multiple pressures may be selected as secondary pressures. For example, when coolant pressure is selected as the primary pressure, at least two of the ambient air, intake manifold air, aftertreatment system air, exhaust air, oil, fuel, and DEF pressure, etc. may be set as the secondary pressures.

In this case, the system controller 100 stores a plurality of LUTs 300, one for each secondary pressure. For example, when the primary pressure is Pressure 3 (e.g., coolant pressure) and secondary pressures is Pressure 2 (e.g., oil pressure) and Pressure 4, the system controller 100 determines the hold time to be Time 3+ΔTime 2+ΔTime 4. Once again, the Δ Time may be positive or negative.

Similarly, in an aspect of the disclosure, the hold speed may be based on pressure only. One of the pressures may be determined as a "primary" pressure for determining a hold speed. The relationship between the primary pressure and the hold speed may be determined in advance. The relationship is specific to a type of engine and may be specific to a type of vehicle. For example, a look up table (LUT) 1100 may be populated with pressure and hold speed values. An example, of a primary pressure and hold speed LUT 1100 is depicted in FIG. 11. The primary pressure/speed LUT 1100 may include N different pressures and N different speeds. N may be determined by the size of the memory.

The primary pressure may or may not be the same for hold time and hold speed. For example, the primary pressure for hold time may be coolant temperature whereas; the primary pressure for hold speed may be ambient.

In a case where the coolant pressure is used as the primary, the coolant pressure has an inverse relationship with hold speed. For example, as the coolant pressure increases, the hold speed decreases.

In other aspects of the disclosure, other fluid pressures may be selected as the primary pressure, such as, but not limited to, ambient pressure or oil pressure or DEF.

When a pressure/speed LUT 1100 is used, the system controller 100 retrieves the same from memory and compares the detected pressure with pressures in the LUT table 1100 and selects the associated or corresponding speed from the same. In a case where the memory is small or where the LUT 1100 does not have a detected pressure, the system controller 100 interpolates the speed based on the pressures/speeds included in the pressure/speed LUT 1100. In an aspect of the disclosure, the system controller 100 may select the closest pressures to the detected pressure, to interpolate the speed. In another aspect of the disclosure, the system controller 100 may use all of the pressures/speeds in the LUT 1100 for interpolation.

Figure 13:
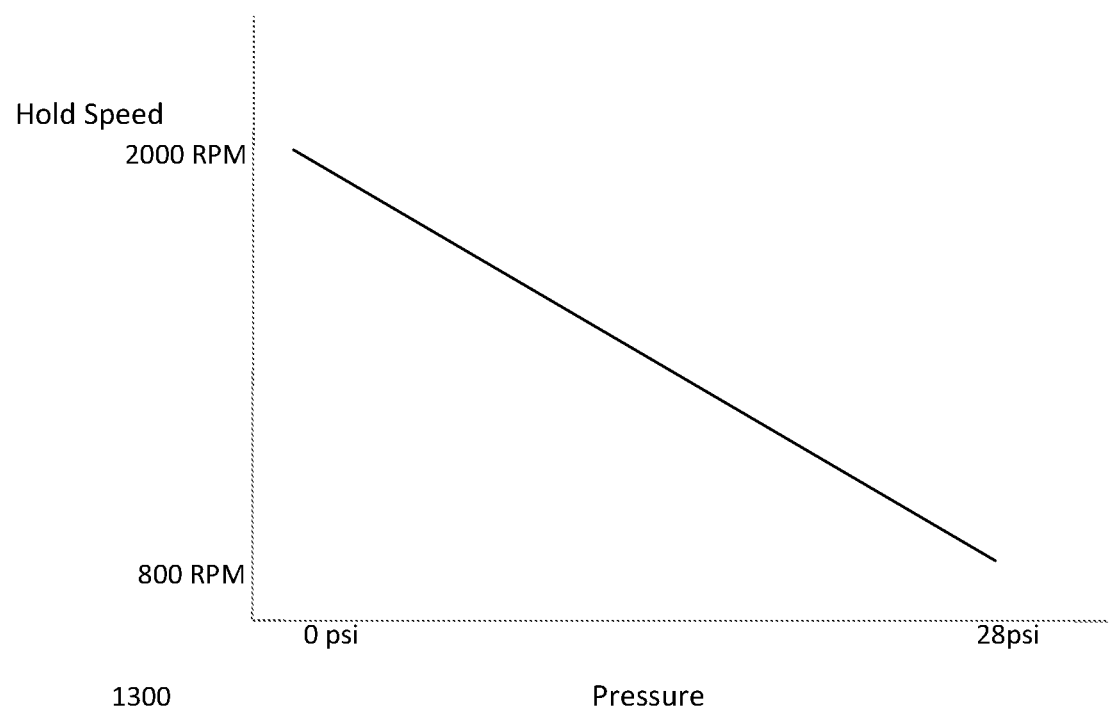
FIG. 13 illustrates an example of a primary pressure verses hold speed relationship in accordance with aspects of the disclosure.

Instead of a pressure/speed look-up table 1100, the system controller 100 may have a relationship graph or equation pre stored in memory. FIG. 13 illustrates an example of a relationship graph 1300 for the hold speed and pressure. While FIG. 13 depicts a linear relationship between hold speed and pressure, the relationship may not be linear. In the example depicted in FIG. 13, the hold speed may be between 800 RPM and 2000 RPM depending on the pressure (between 0 psi and 28 psi). The hold speeds and pressures depicted in FIG. 13 are for description purposes only and the specific speed and pressure relationship may change or be different in use. For example, these values may be different for different types of engines.

Other pressures (other than the primary) are used as secondary pressure(s). Secondary pressures are used to adjust the hold speed which was determined. FIG. 12 illustrates an example of a pressure adjustment LUT for hold speed 1200.

For example, when the coolant pressure is selected as the primary pressure, oil pressure may be selected as the secondary pressure. Thus, the system controller 100 may determine the hold speed by using both LUT 1100 and 1200. For example, when the primary pressure is Pressure 3 (e.g., coolant pressure) and secondary pressure is Pressure 4 (e.g., oil pressure), the system controller 100 determines the hold speed to be Speed 3+ΔSpeed 4. The ΔSpeed may be positive or negative. Other combinations of primary and secondary pressures may be used such as, but not limited to, oil pressure and ambient pressure or oil pressure and DEF. For example, when the primary pressure is Pressure 2 (e.g., oil pressure) and secondary pressure is Pressure 1 (e.g., ambient pressure), the system controller 100 determines the hold speed to be Speed 2+ΔSpeed 1.

Multiple pressures may be selected as secondary pressure. For example, when coolant pressure is selected as the primary pressure, at least two of the ambient air, intake manifold air, aftertreatment system air, exhaust air, oil, fuel, and DEF pressure may be set as the secondary pressures.

In this case, the system controller 100 stores a plurality of LUTs 600, one for each secondary pressure.

Similarly, as in above, instead of secondary adjustment pressure/time or pressure/speed LUT 900/1200, the system controller 100 may have a plurality of pressure/time LUT 800 or pressure/speed LUT 1100. Each set of LUT may be populated at a different secondary pressure. Therefore, instead of using multiple LUTs for each of the time and speed determinations, the system controller 100 would use one for each.

In another aspect of the disclosure, both temperature and pressure are used to determine the hold speed and hold time. In this aspect of the disclosure, a LUTs may be used. The LUT would be populated during testing using different known temperatures and pressures for the primary and secondary temperature and pressures.

For example, if a coolant temperature is used as the primary temperature, the hold time/speed may be longer at lower pressure. Additionally, the altitude may affect the hold time/speed. For example, the hold time/speed would be longer at high altitudes than at sea level for the same coolant temperature.

In another aspect of the disclosure, the system controller 100 may adjust the hold speed and hold time based on a SOC of the energy storage device 125. For example, when the SOC of the energy storage device 125 is below another threshold, the system controller 100 may shorten the hold time and/or hold speed.

At S7, the system controller 100 transmits a signal to the engine controller 105. In an aspect of the disclosure, the signal is an instruction not to supply fuel to the engine. In another aspect of the disclosure, the signal indicates the determined hold speed and hold time. In another aspect of the disclosure, there is no first instruction.

At S9, once the system controller 100 determines the hold speed and hold time, the system controller 100 causes power to be supplied from the energy storage device 125 to a generator/motor. In an aspect of the disclosure, the system controller 100 couples the energy storage device 125 to an inverter (not shown) which converts the DC voltage supplied by the energy storage device 125 into an energy in the form of an AC voltage and current. The AC voltage and current is controlled in a manner allowing for a controlled rotation of the generator/motor. In another aspect of the disclosure a DC generator/motor may be used. Therefore, the inverter may be replaced with a DC regulating device. In another aspect of the disclosure, the voltage source is an AC voltage source. In another aspect of the disclosure, the generator/motor is hydraulically, pneumatically, or mechanically rotated to effect the engine start. In an aspect of the disclosure, the rotational portion of the generator/motor is mechanically coupled to the engine.

Figure 17:
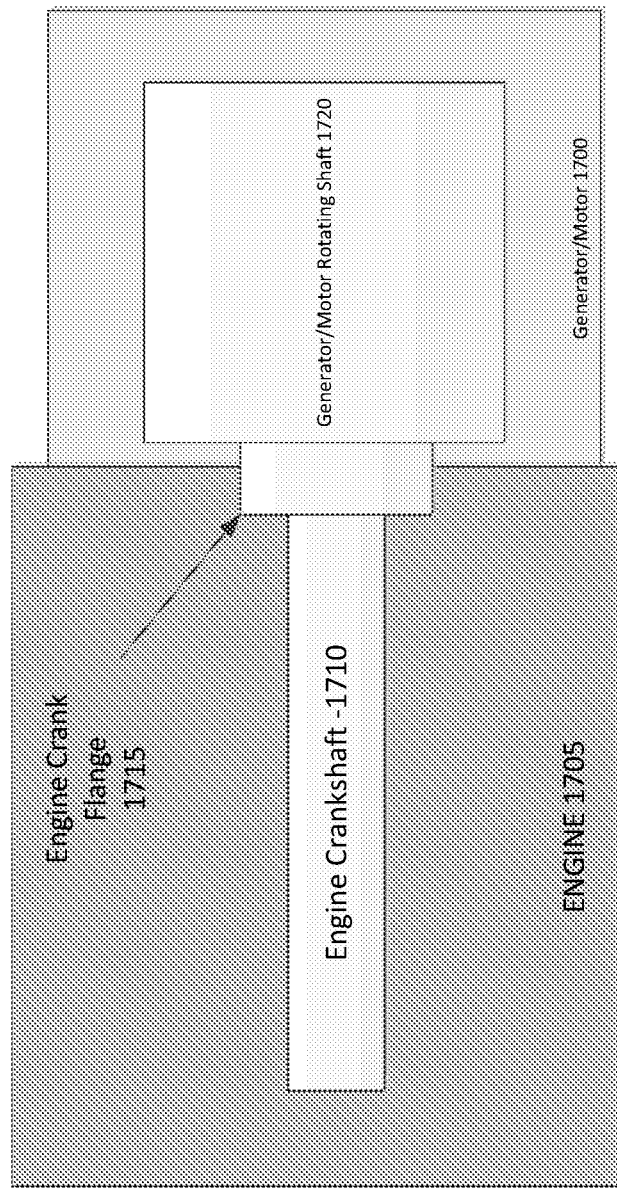
FIG. 17 illustrates a block diagram of a mechanical connection between an engine and generator/motor in accordance with aspects of the disclosure.

FIG. 17 illustrates a block diagram showing an example of a mechanical coupling between the engine 1705 and the generator/motor rotational (rotating) shaft 1720. For example, a generator/motor rotating shaft 1720 may be mechanically coupled to the crankshaft 1710. The rotating shaft 1720 of the generator/motor 1700 may be either the rotor or stator. As shown above, the rotating shaft 1720 is mechanical attached to the engine crank flange 1715 which is part of the engine crankshaft 1710 which is the rotating portion of the engine 1705 to which the cylinders of the engine fire against to rotate. The rotating shaft of the generator/motor 1720 may be coupled directly to the engine crank flange 1715, or similarly through a flywheel, gearbox, clutch, torque converter, power take off (PTO), belt driver, gearbox, or other similar commonly available connections to the engine rotational output.

In this example, when the generator/motor rotor begins to rotate as a result of the energy being applied, the crankshaft 1710 also rotates. For purposes of the description, the rotation speed, RPM of the generator/motor rotating shaft 1720 and crankshaft 1710 are the same. The system controller 100 is coupled to an RPM sensor 145. The RPM sensor 145 detects the rotational speed of the shaft 1720.

While FIG. 14 shows S9 after S7, the order of S7 and S9 may be switched. In another aspect of the disclosure, the system controller 100 and the engine controller 105 may be the same controller or multiple combinations of controllers with division of responsibility that results in the same functionality.

The system controller 100 sets a timer to the determined hold time. The system controller 100 monitors the output of the RPM sensor 145. Once the generator/motor shaft 1720 reaches the hold speed, the system controller 100 starts the timer.

At S11, the system controller 100 determines whether the timer has expired, e.g., timer=0. When the timer expires ("Y" at S11), the system controller 100 issues an instruction to the engine controller 105 via the communication line 110 (S13). The instruction indicates to the engine controller 105 that fueling is allowed. In another aspect of the disclosure, the fueling determination is made by the engine and there is no instruction from the system controller 100.

If the timer did not expire ("N" at S11), the system controller 100 waits until it expires.

Following S13, the system controller may stop applying the energy to the generator/motor since the engine 1705 is now running on its own.

Engine Controller Functions with a Fuel Shutoff

The engine controller 105 continuously monitors the output of the various temperature sensors 115 and pressure sensors 120 and calculates the temperatures and pressures. Periodically, the engine controller 105 transmits the temperature and pressure information to the system controller 100 via the communication line 110 at S22.

The engine controller 105 waits for an instruction from the system controller 100. At this point, the engine is off and not being supplied with fuel.

At S24, the engine controller 105 determines whether it has received an instruction from the system controller 100, i.e., a first instruction. At this point, the crankshaft of the engine is beginning to rotate due to the rotation of the shaft 1720. As noted above, the first instruction is an instruction not to supply fuel to the engine. Typically, an engine controller would cause fuel to be supplied to cylinders to drive the engine to the setpoint of the low idle speed governor. However, in accordance with aspects of the disclosure, even though the crankshaft 1710 is rotating less than the setpoint of the low idle speed governor, the engine controller 105 at S25 does not supply fuel to the cylinders (at least one). In an aspect of the disclosure, at S25, the engine controller 105 may shut off the fuel by disabling the fuel pump, and/or closing a valve, and/or disabling the injectors, and/or redirecting fuel, or use some other means to accomplish the fuel supply to be stopped and not allow fuel in the cylinders (at least one).

In an aspect of the disclosure, the first instruction may also indicate the hold speed and the hold time. At S26, the engine controller 105 determines whether the engine is rotating. For example, an RPM sensor may be used to determine the RPM of the flywheel (if applicable), a camshaft or the crankshaft 1710. In an aspect of the disclosure, the RPM sensor is an eddy current sensor. Markings are located on the flywheel or cam shaft. The markings are detected by the eddy current sensor. The markings may cause a period measurement between one or more markings to determine the RPM (rotations per minute) of the crankshaft of the engine. Knowing the period and the angle of travel experienced then allows for the calculation of the RPM of the engine and the position in the firing sequence of the engine.

Other types of sensors may be used such as an optical sensor.

As the engine speed begins to rotate through when it holds at the hold speed, the engine controller 105 determines and continuously refines the alignment of a camshaft or crankshaft 1710 and cylinders at S28. In another aspect of the disclosure, instead of a hold speed, a preset speed threshold may be used instead. For example, in a case where the first instruction does not indicate a hold speed, the preset speed threshold may be used.

The determined alignment is subsequently used for determining a timing and order of supplying fuel to the cylinders.

For example, a typical compression ignition engine comprises a plurality of cylinders (e.g., combustion chambers). The combustion chamber is where fuel is combusted. A piston moves within the chamber, e.g., reciprocating motion. The piston transmits a thrust force generated to the crankshaft 1710 through one or more connecting rods. The crankshaft 1710 converts the reciprocating motion into rotary motion. Each combustion chamber has an injector. The injector injects fuel into the chamber. Each combustion chamber further has an inlet valve(s) and an exhaust valve(s). Exhaust from the combustion chamber is removed through the exhaust valve(s).

The compression ignition engine is a four-stroke engine. The piston goes through four strokes while turning the crankshaft 1710. The four strokes comprise suction, compression, combustion and exhaust. The timing of fueling is optimized to coincide with a position of the piston and stroke.

During the suction stroke, the intake valve is open and the piston pulls an air-fuel mixture into the combustion chamber (cylinder) via downward motion. The piston cycle begins at top dead center ("TDC") and complete the cycle for that cylinder in one rotation of the CAM or two rotations of the crank. Bottom dead center ("BDC") is when the piston is at its lowest point in the cylinder.

During the compression stroke, the intake and exhaust valves are closed and the piston compresses the air-fuel mixture. The piston begins at BDC and ends at TDC.

During the combustion or the power stroke, the air-fuel mixture is ignited (heat generated by the high compression). The piston is near TDC when the air-fuel mixture is ignited.

During the exhaust stroke, the exhaust valve is open and the piston moves from BDC to TDC which expels the air-fuel mixture through the valve(s).

In accordance with aspects of the disclosure, the alignment of the camshaft or crankshaft allows for the determination of TDC for each piston within the combustion chamber (cylinder).

The alignment of the camshaft may be determined in a manner described in U.S. Pat. No. 5,165,271 which is incorporated herein by reference.

Once the alignment is determined, the engine controller 105 waits until another instruction is received from the system controller 100 to begin fueling (S32).

Additionally, during the hold time, since the engine is spinning and the pistons moving, certain fluid pumps, oil, coolant and DEF are activated by the engine controller 105. This in turn causes the engine to be lubricated with oil, have coolant fluid flow through the engine cooling system, air to flow through the engine and be pumped out of the exhaust and (if diesel), the DEF injection system pressurized etc. All of these actions either mechanically or hydromechanically or electrically ready the engine for beginning of fueling once the system controller 100 issues the second instruction (S32). This readying of the engine for the beginning of fueling reduces the wear on the engine by causing lubrication before ever having fueled combustion event.

At S30, the engine controller 105 determines whether it received an instruction from the system controller 100, e.g., second instruction. In an aspect of the disclosure, the second instruction is a torque or speed command or a command to turn on fueling.

When the engine controller 105 receives the second instruction ("Y" at S30), the engine controller 105 executes the torque or speed command. For example, when the torque or speed command is higher than the current torque or speed of the engine, the engine controller 105 allows fuel to be supplied at S32, maintaining the cylinder firing to produce the desired effects. If the fuel was shut off in response to the first instruction, the engine controller 105 turns it on again at S32. At this time, the system controller may stop applying the energy to the generator/motor since the engine 1705 is now running on its own. In an aspect of the disclosure, once the hold time expires, the engine controller 105 turns on the fuel (if OFF).

For example, using the alignment and timing determined in S28, the engine controller 105 causes fuel to be supplied to a respective combustion chamber (cylinder) when the piston is at the correct position in its cycle. The order of supplying the fuel to the combustion chambers (cylinders) is based on the order of when each piston is at its correct position in the firing order. Thus, allowing the engine to be started with minimal mistimed firing and fueling occurrences, if any.

Engine Controller Functions without Fuel Shutoff Instruction

In another aspect of the disclosure, instead of the first instruction being an instruction not to supply fuel to the engine, the first instruction is a torque or speed command that is below the hold speed and above the low idle speed governor influence to ensure fueling to the engine cylinders (at least one) is held off. In this aspect of the disclosure, the generator/motor may rotate the shaft 1710 of the engine above low idle speed governor influence at an increased rate over the conventional starter. In this aspect of the disclosure, the system controller 100 controls the rotating shaft 1720 to the hold speed by supplying energy to the generator/motor. The instruction to the engine accomplishes a no fuel condition between the speed where the low idle speed governor influence is ended and the hold speed. Once the hold speed and hold time are achieved, the system controller 100 will cease the energy supplied to the generator/motor and may send a second instruction. In response to the second instruction, the engine controller 105 causes fuel to be supplied to allow a smooth transition to the desired torque or speed. After the second instruction, the engine is now fueling normally and the starting is complete.

Figure 16:
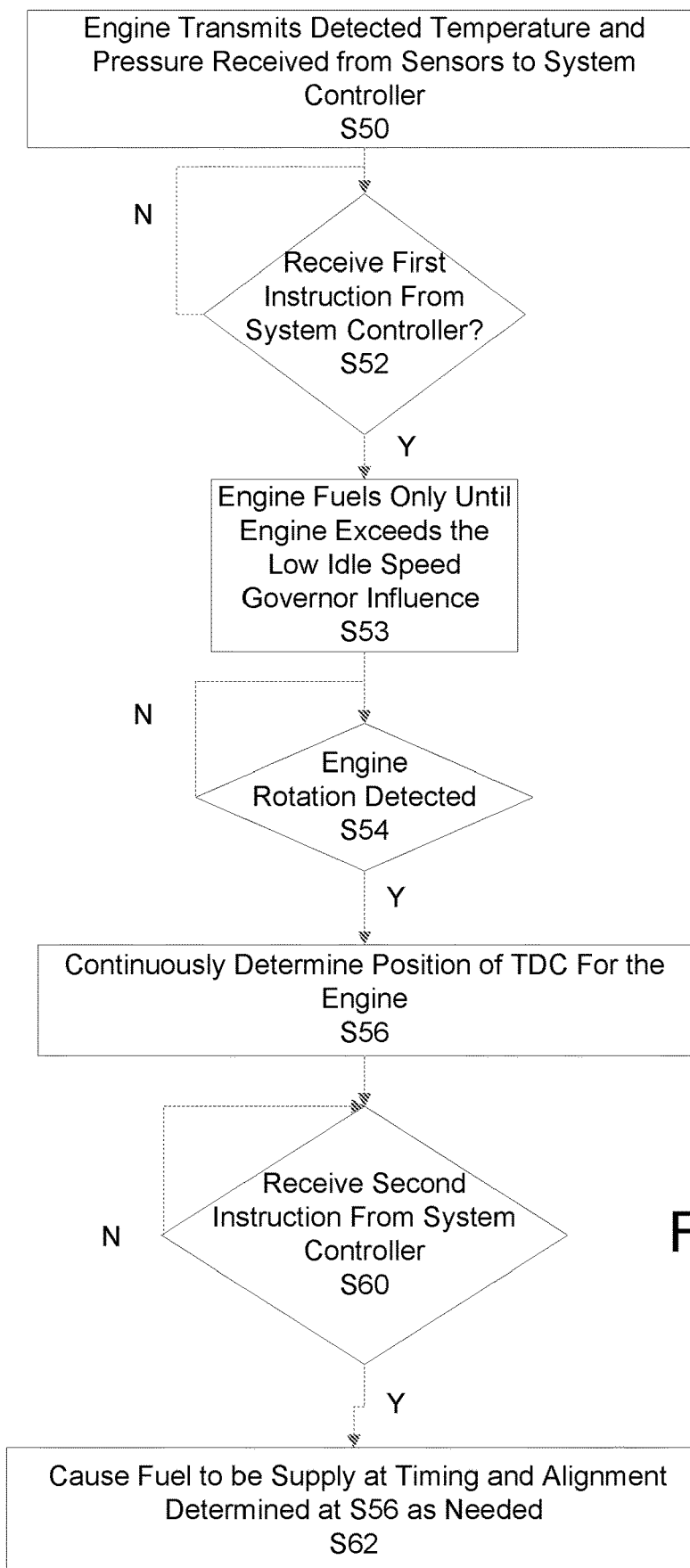
FIG. 16 illustrates a flow chart for controlling an engine during engine start up executed by an engine controller in accordance with other aspects of the disclosure.

FIG. 16 illustrates a flow chart for controlling an engine 1705 during engine start up executed by an engine controller 105 in accordance with this aspect of the disclosure.

At S50, the engine controller 105 continuously monitors the output of the various temperature sensors 115 and pressure sensors 120 and calculates the temperatures and pressures. Periodically, the engine controller 105 transmits the temperature and pressure information to the system controller 100 via the communication line 110 in a similar manner as described above in S22.

At S52, the engine controller 105 determines whether a torque or speed command is received from the system controller 100, e.g., first instruction, which in this aspect of the disclosure is a torque or speed command that is below the current operating torque or speed of the engine. In response to receiving the first instruction, at S53 fuel is injected into the cylinders (at least one) of the engine 1705 only until the speed of the engine exceeds the low idle speed governor influence.

After the first instruction is received by the engine controller 105 ("Y" S52), the engine controller 105 waits for another torque or speed command while the rotating shaft 1720 of the generator/motor rotates under the control of the system controller 100. This in turn rotates the crankshaft 1710 of the engine 1705 whereby the same accelerates to the hold speed. The hold speed needs to be higher than the low idle speed governor influence of the engine 1705 to ensure fueling is off.

At S54, the engine controller 105 determines whether the engine 1705 is rotating. For example, an RPM sensor may be used to determine the RPM of the crankshaft (or camshaft). In another aspect of the disclosure, the system controller 100 determines the speed based on the rotational speed of the rotating shaft 1720 of the generator/motor. The system controller 100 may communicate the speed by the communication line 110.

As the engine speed begins to rotate ("Y" at S54) through when it holds at the hold speed, the engine controller 105 determines and continuously refines the alignment of a camshaft or crankshaft 1710 and cylinders at S56.

Steps S56-62 are similar to steps S28-32 and will not be described again in detail (without turning on/off the fueling directly).

During S60, the engine controller 105 waits for the second instruction from the system controller 100, which may be a torque or speed command.

At S62, upon receipt of the second instruction, fuel is applied (at the measuring timing and alignment determined at S56) to the engine 1705 and the engine start process is complete. If a torque or speed command is received outside of the low idle speed governor influence, then the engine will fuel to achieve at least at that low idle speed since the system controller 100 is no longer rotating the crankshaft.

Engine Controller Functions without Instructions

In another aspect of the disclosure, instead of the first instruction being an instruction not to supply fuel to the engine, the first instruction does not exist. In this aspect of the disclosure, the generator/motor may rotate the shaft 1710 of the engine above low idle speed governor influence at an increased rate over the conventional starter. In this aspect of the disclosure, the system controller 100 controls the rotating shaft 1720 to the hold speed by supplying energy to the generator/motor. The engine accomplishes a no fuel condition between the speed where the low idle speed governor influence is ended and the hold speed. Once the hold speed and hold time are achieved, the system controller 100 will cease the energy supplied to the generator/motor for the purposes of starting. The engine controller 105 causes fuel to be supplied as needed and the start is complete.

Figure 18:
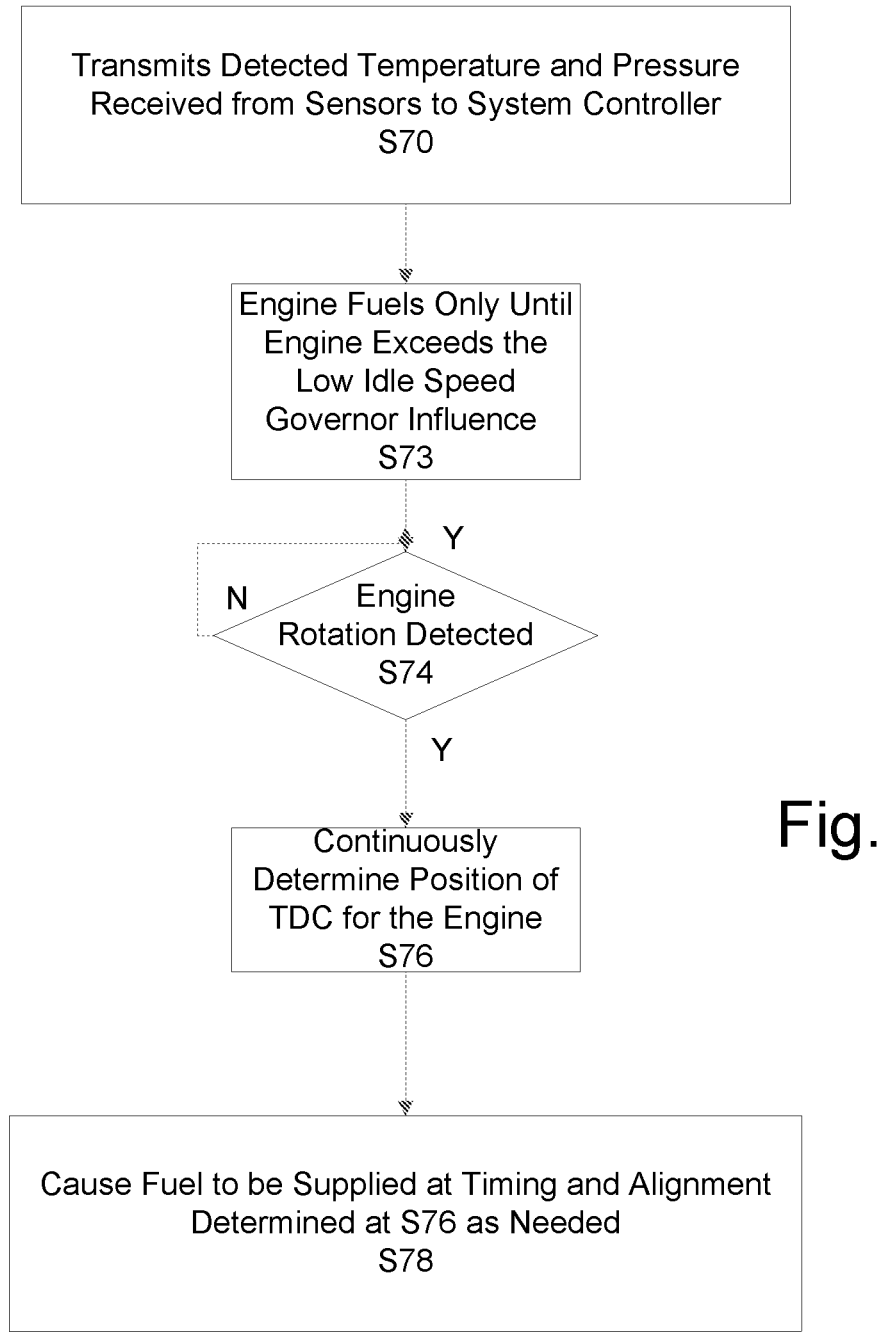
FIG. 18 illustrates a flow chart for controlling an engine during engine start up executed by an engine controller in accordance with other aspects of the disclosure.

FIG. 18 illustrates a flow chart for controlling an engine 1705 during engine start up executed by an engine controller 105 in accordance with this aspect of the disclosure.

S70 is identical to S50 and will not be described again here. At S73 fuel is injected into the cylinders (at least one) of the engine 1705 only until the speed of the engine exceeds the low idle speed governor influence.

S74 is identical to S54 and will not be described again here. The order of S73 and S74 may be reversed. For example, when the rotation of the engine is detected ("Y"), the engine controller 105 causes fuel to be injected into at least one cylinder of the engine 1705 to reach the low idle speed governor influence without receiving a specific instruction.

As the engine speed begins to rotate ("Y" at S74) through when it holds at the hold speed, the engine controller 105 determines and continuously refines the alignment of a camshaft or crankshaft 1710 and cylinders at S76.

Steps S76 and S78 are similar to steps S28 and S32 and will not be described again in detail (without turning on/off the fueling directly).

At S78, fuel is applied (at the measuring timing and alignment determined at S76) as needed to the engine 1705 and the engine start process is complete.

In accordance with aspects of the disclosure, by allowing the engine to rotate at a variable hold speed and time prior to fueling, the fluid pumps, oil, coolant, DEF, and fuel are placed in optimal operating conditions prior fueling. In addition, this allows the engine controller 105 to ready the engine emission control systems (e.g. powering, initializing, pressurizing, and stabilizing sensors and actuators), while the hybrid system spins the engine without fueling. Examples of engine emission control systems are: the dosing systems (e.g. hydrocarbon dosing, DEF dosing, etc.); sensors (e.g. oxygen sensors, NOx sensors, particulate matter sensors, ammonia sensors, temperature sensors, pressures sensors, humidity sensors, etc.); and actuators (e.g. dosers, fuel shutoff valves, injectors, variable geometry turbo, etc.). The specific components of the engine emission control systems may be particular to the engine or vehicle type. Readying these systems associated with emissions control prior to fueling will allow for accurate emission control from the firing of the first cylinder. Thus, allowing the engine to be started with minimal mistimed firing and fueling occurrences, if any, while the engine is rotated up to and at the hold speed (for the hold time).

In accordance with aspects of the disclosure, in response to an instruction not to supply fuel to the engine, the engine controller 105 may shut off the fueling while the generator/motor rotates the engine crankshaft 1710 until the hold time (at the hold speed) is achieved. In accordance with aspects of the disclosure, in response to an instruction of a torque or speed outside the low idle speed governor influence, the engine controller 105 does not cause fuel to be supplied (fueling may or may not be on) while the generator/motor rotates the engine crankshaft 1710 until the hold time (at the hold speed) is achieved.

In an aspect of the disclosure, the vehicle may comprise either glow plugs or an intake heater. However, since the engine is spinning at the hold speed and hold time prior to fueling, these elements are not needed. Thus, in accordance with aspects of the disclosure, the engine controller 105 may deactivate the glow plugs or the intake heater. For example, the engine controller 105, upon receipt of the first instruction (S24) or (S52) may deactivate the glow plug and/or intake heater. Deactivation includes not activating the same.

The hybrid electric vehicle described herein may be a car, bus, taxi, vessel, airplane, train, tank, truck, or helicopter or any other moving apparatus propelled by an engine. The hybrid electric vehicle may have multiple engines such as in a marine environment. Each engine may be started in a manner described herein. When a multiple engine system is used, each engine is coupled to a respective generator (genset). One system controller 100 may be used to perform the functionality described herein. In other aspects of the disclosure, each genset may have a separate controller (system controller). The hold time and the hold speed described herein may be different for different types of vehicle applications. For example, engines used in a marine environment may have different hold times and speeds than ground-based vehicles.

As used herein, the term "controller" such as a system controller or engine controller may include a single core processor, a multi-core processor, multiple processors located in a single device, or multiple processors in wired or wireless communication with each other and distributed over a network of devices, the Internet, or the cloud. Accordingly, as used herein, functions, features or instructions performed or configured to be performed by a "controller", may include the performance of the functions, features or instructions by a single core processor, may include performance of the functions, features or instructions collectively or collaboratively by multiple cores of a multi-core processor, or may include performance of the functions, features or instructions collectively or collaboratively by multiple processors, where each processor or core is not required to perform every function, feature or instruction individually.

Various aspects of the present disclosure may be embodied as a program, software, or computer instructions embodied or stored in a computer or machine usable or readable medium, or a group of media which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided, e.g., a computer program product.

The computer readable medium could be a computer readable storage device or a computer readable signal medium. A computer readable storage device, may be, for example, a magnetic, optical, electronic, electromagnetic, infrared, or semiconductor system, apparatus, or device, or any suitable combination of the foregoing; however, the computer readable storage device is not limited to these examples except a computer readable storage device excludes computer readable signal medium. Additional examples of the computer readable storage device can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an optical storage device, or any appropriate combination of the foregoing; however, the computer readable storage device is also not limited to these examples. Any tangible medium that can contain, or store, a program for use by or in connection with an instruction execution system, apparatus, or device could be a computer readable storage device.

A computer readable signal medium may include a propagated data signal with computer readable program code embodied therein, such as, but not limited to, in baseband or as part of a carrier wave. A propagated signal may take any of a plurality of forms, including, but not limited to, electro-magnetic, optical, or any suitable combination thereof. A computer readable signal medium may be any computer readable medium (exclusive of computer readable storage device) that can communicate, propagate, or transport a program for use by or in connection with a system, apparatus, or device. Program code embodied on a computer readable signal medium may be transmitted using any appropriate medium, including but not limited to wireless, wired, optical fiber cable, RF, etc., or any suitable combination of the foregoing.

The terminology used herein is for the purpose of describing particular embodiments only and is not intended to be limiting the scope of the disclosure and is not intended to be exhaustive. Many modifications and variations will be apparent to those of ordinary skill in the art without departing from the scope and spirit of the disclosure.

What is claimed is:

1. A system for a hybrid electric vehicle comprising:
a generator/motor mechanically couplable to a crankshaft of an internal combustion engine;
a rechargeable energy storage device in communication with the generator/motor;
a second processor configured to determine when to start the internal combustion engine, cause energy to be supplied to the generator/motor to cause the generator/motor and crankshaft to rotate to at least a hold speed, transmit a first instruction to a first processor when determining that the internal combustion engine should be started, whereby the first processor does not supply fuel to at least one cylinder of the internal combustion engine in response to the first instruction; and transmit a second instruction to the first processor after a variable period of time has elapse after the generator/motor or crankshaft has reached at least the hold speed, the variable period of time being based at least on a temperature measurement, wherein in response to the second instruction, the first processor enables fuel to be supplied to the internal combustion engine;
and a memory device configured to store relationships between a plurality of temperatures and a plurality of periods of time, respectively, wherein the second processor is configured to select one of the plurality of periods of time based on a sensed temperature and set the selected one of the plurality of periods of time as the variable period of time
wherein the second processor further receives pressure information for at least one fluid, and the second processor adjusts the selected one of the plurality periods of time based on the received pressure information for at least one fluid prior to setting the selected one of the plurality of periods of time as the variable period of time, and sets the adjusted period of time as the variable period of time.

2. The system for a hybrid electric vehicle of claim 1, wherein the temperature measurement is a measurement of a temperature of a coolant.

3. The system for a hybrid electric vehicle of claim 2, wherein the second processor receives temperature information for oil temperature, and the second processor adjusts the selected one of the plurality periods of time based on the received temperature information for the oil temperature prior to setting the selected one of the plurality of periods of time as the variable period of time, and sets the adjusted period of time as the variable period of time.

4. The system for a hybrid electric vehicle of claim 2, wherein the second processor receives temperature information for at least one other fluid, and the second processor adjusts the selected one of the plurality periods of time based on the received temperature information for the at least one other fluid prior to setting the selected one of the plurality of periods of time as the variable period of time, and sets the adjusted period of time as the variable period of time.

5. The system for a hybrid electric vehicle of claim 4, wherein the at least one other fluid is selected from a group consisting of ambient air, intake manifold air, aftertreatment system air, exhaust air, oil, fuel, coolant, and diesel exhaust fluid (DEF).

6. The system for a hybrid electric vehicle of claim 1, wherein the temperature measurement is a measurement of oil temperature and wherein the second processor receives temperature information for at least one other fluid, and the second processor adjusts the selected one of the plurality periods of time based on the received temperature information for at least one other fluid prior to setting the selected one of the plurality of periods of time as the variable period of time, and sets the adjusted period of time as the variable period of time.

7. The system for a hybrid electric vehicle of claim 1, wherein the pressure of at least one fluid is selected from a group consisting of ambient air, intake manifold air, aftertreatment system air, exhaust air, oil, fuel, coolant, and DEF.

8. The system for a hybrid electric vehicle of claim 1, wherein the second processor is configured to determine start of the internal combustion engine based at least on a state of charge of the rechargeable energy storage device, a global positioning system (GPS) signal, an expected route, a torque request of a user and a switch actuated by the user.

9. The system for a hybrid electric vehicle of claim 1, further comprising glow plugs or an intake heater, wherein the first processor is configured to, in response to receiving the first instruction deactivates the glow plugs or the intake heater.

10. The system for a hybrid electric vehicle of claim 1, wherein the hold speed is determined based at least on a temperature measurement.

11. The system for a hybrid electric vehicle of claim 10, wherein the hold speed is further determined based at least on a pressure measurement.

12. The system for a hybrid electric vehicle of claim 1, wherein the variable period of time is further based on ambient pressure.

13. The system for a hybrid electric vehicle of claim 1, wherein in response to the first instruction, fueling is shut off to at least one cylinder.

14. The system for a hybrid electric vehicle of claim 1, wherein the variable period of time is further based on a state of charge of the rechargeable energy storage device.

15. The system for a hybrid vehicle of claim 1, wherein in response to receipt of the second instruction, the first controller is configured to fuel cylinders in a specific order and a specific timing, the specific order and the specific timing determined prior to the second instruction.

16. The system for a hybrid vehicle of claim 1, wherein after the receipt of the first instruction, the first controller is configured to prepare engine emission control systems to allow for accurate emission control from a firing of a first cylinder.

17. The system for a hybrid vehicle of claim 1, wherein after the receipt of the first instruction, the first controller is configured to not put fuel in at least one cylinder so pressurization and lubrication can occur to cause oil to flow to bearing surfaces before a first fueled combustion event.

18. A computer readable storage device having instructions, which when executed by a processor, cause the processor to execute:
- determining when to start an internal combustion engine of a hybrid electric vehicle;
- causing energy to be supplied to a generator/motor mechanically couplable to the internal combustion engine, to cause the generator/motor or crankshaft to rotate to at least a hold speed;
- transmitting a first instruction to an engine processor when determining that the internal combustion engine should be started, whereby the engine processor does not supply fuel to the internal combustion engine in response to the first instruction;
- transmit a second instruction to the engine processor after a variable period of time has elapse after the generator/motor or crankshaft has reached at least the hold speed, the variable period of time being based on at least on a temperature, wherein in response to the second instruction, the first processor enables fuel to supplied to the internal combustion engine; and
- configuring a memory device to store relationships between a plurality of temperatures and a plurality of periods of time, respectively, wherein the second processor is configured to select one of the plurality of periods of time based on a sensed temperature and set the selected one of the plurality of periods of time as the variable period of time
- wherein the second processor further receives pressure information for at least one fluid, and the second processor adjusts the selected one of the plurality periods of time based on the received pressure information for at least one fluid prior to setting the selected one of the plurality of periods of time as the variable period of time, and sets the adjusted period of time as the variable period of time.

19. A computer readable storage device having instructions, which when executed by a processor, cause the processor to execute:
- determining when to start an internal combustion engine of a hybrid electric vehicle;
- causing energy to be supplied to a generator/motor mechanically couplable to the internal combustion engine, to cause the generator/motor or crankshaft to rotate to at least a hold speed;
- transmitting a first instruction to an engine processor when determining that the internal combustion engine should be started, whereby the engine processor causes fueling only while at or below a low idle speed governor influence and stops fueling when the crankshaft speed exceeds the low idle speed governor influence;
- transmits a second instruction to the engine processor after a variable period of time has elapsed after the generator/motor or crankshaft has reached at least the hold speed, the variable period of time being based on at least on a temperature, whereby the engine processor causes fueling to the internal combustion engine in response to the second instruction according to a command included in the second instruction; and
- configuring a memory device to store relationships between a plurality of temperatures and a plurality of periods of time, respectively, wherein the second processor is configured to select one of the plurality of periods of time based on a sensed temperature and set the selected one of the plurality of periods of time as the variable period of time
- wherein the second processor further receives pressure information for at least one fluid, and the second processor adjusts the selected one of the plurality periods of time based on the received pressure information for at least one fluid prior to setting the selected one of the plurality of periods of time as the variable period of time, and sets the adjusted period of time as the variable period of time.

20. A computer readable storage device having instructions, which when executed by a processor, cause the processor to execute:
- determining when to start an internal combustion engine of a hybrid electric vehicle;
- causing energy to be supplied to a generator/motor mechanically couplable to the internal combustion engine, to cause the generator/motor or crankshaft to rotate to at least a hold speed; whereby an engine processor causes fueling only while at or below a low idle speed governor influence and stops fueling when the crankshaft speed exceeds the low idle speed governor influence;
- cease the energy supplied to the generator/motor for the purposes of starting after a variable period of time has elapsed after the generator/motor or crankshaft has reached at least the hold speed, the variable period of time being based on at least on a temperature, whereby the engine processor causes fueling to the internal combustion engine as needed; and
- storing relationships between a plurality of temperatures and a plurality of periods of time, respectively, wherein the second processor is configured to select one of the plurality of periods of time based on a sensed temperature and set the selected one of the plurality of periods of time as the variable period of time
- wherein the second processor further receives pressure information for at least one fluid, and the second processor adjusts the selected one of the plurality periods of time based on the received pressure information for at least one fluid prior to setting the selected one of the plurality of periods of time as the variable period of time, and sets the adjusted period of time as the variable period of time.

* * * * *